G. A. TAYLOR.
DRAFT ATTACHMENT FOR VEHICLES.
APPLICATION FILED JAN. 3, 1916.
1,206,269.
Patented Nov. 28, 1916.
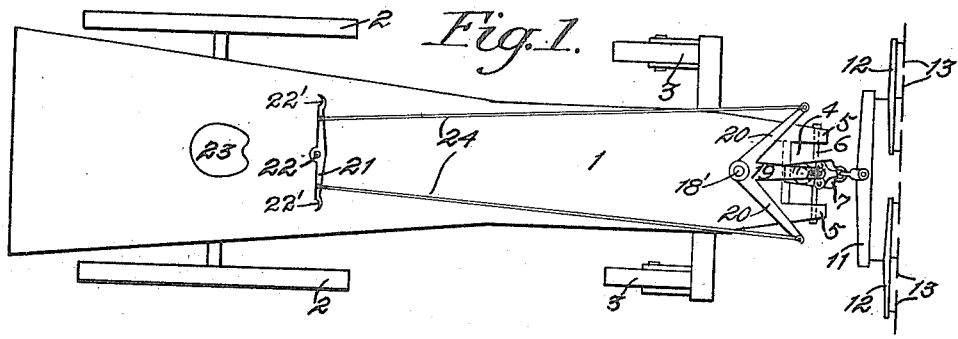
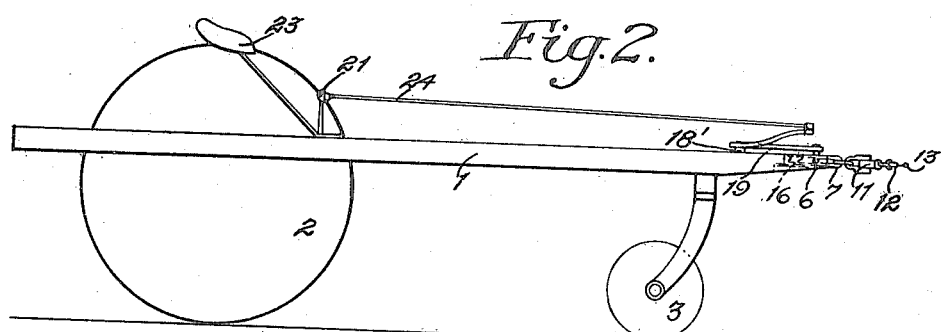
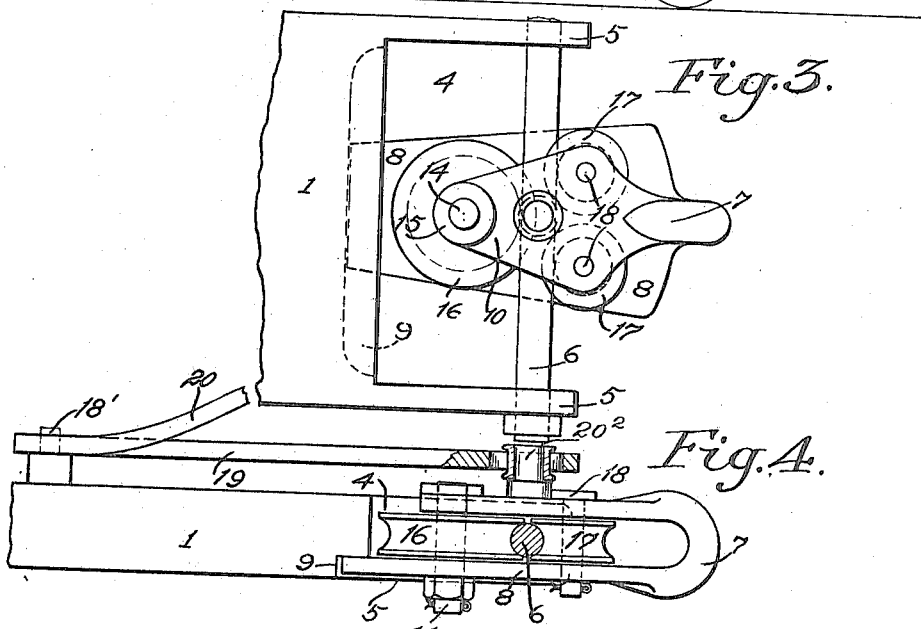
WITNESS
INVENTOR.
Gardner A. Taylor
BY
ATTORNEYS.

UNITED STATES PATENT OFFICE.

GARDNER A. TAYLOR, OF SALINAS, CALIFORNIA.

DRAFT ATTACHMENT FOR VEHICLES.

1,206,269.

Specification of Letters Patent. Patented Nov. 28, 1916.

Application filed January 3, 1916. Serial No. 69,804.

*To all whom it may concern:*

Be it known that I, GARDNER A. TAYLOR, a citizen of the United States, residing at Salinas, in the county of Monterey and State of California, have invented certain new and useful Improvements in Draft Attachments for Vehicles, of which the following is a specification.

The present invention relates to improvements in movable draft attachments, particularly designed for use in connection with farming implements, such as beet plows, whereby the pull thereon may be shifted relatively to the longitudinal center of the implement to guide the same when in use.

The principal objects of the invention are to provide an apparatus which is freely movable transversely of the implement and is maintained in its desired adjusted position by tension applied by the operator on the shifting means, one which is simple in construction, may be manufactured at little cost, and is foot operated, permitting the free use of the operator's hands for driving and operating the various tools carried by the implement.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in top plan of an embodiment of my invention applied to a beet plow. Fig. 2 is a view in side elevation. Fig. 3 is an enlarged top plan view with the shifting member removed. Fig. 4 is an enlarged view in side elevation.

Referring more particularly to the several views of the drawings, wherein like characters of reference designate corresponding parts—1 is a vehicle body preferably that of a wheeled beet plow having the rear supporting wheels 2, and the front supporting wheels 3 mounted to pivot on a vertical axis. The front of the frame is cut out, as at 4, providing parallel spaced arms 5 at each side thereof, which are connected at their outer ends by the transversely extending draft rod 6 preferably circular in cross section. The draft rod is received in a substantially U-shaped clevis 7, the lower member 8 thereof being flattened and tapering toward its free end and adapted to be received in a transversely extending groove or cut out 9, formed in the under face of the body in rear of the cut out 4. The upper portion 10 of the clevis is flattened, and to the loop connecting the upper and lower portions is adapted to be attached the draft means, that illustrated, consisting of the double tree 11 carrying the pivoted trees 12 to which are attached the swingle trees 13.

A spindle 14 formed with an enlarged shoulder 15 adjacent one end thereof, is extended through suitable openings in the portions 8 and 10 of the clevis with the shoulder resting on the top portion 10, and said spindle provides a bearing for and rotatably mounts a wheel 16 positioned between the portions 8 and 10 and having a grooved periphery and in which is received the draft rod 6. The wheel 16 is positioned in rear of the draft rod 6 and receives the strain exerted on the clevis by the draft means. Suitable grooved idlers 17 are rotatably positioned between the portions 8 and 10 in advance of the draft rod 6 and are rotatably supported in contact therewith by suitable pins 18. The wheel 16 and idlers 17 provide a three point suspension for the clevis and enable the same to be readily shifted longitudinally of the draft bar, and the end of the lower portion 8 operating in the groove 9 prevents the downward swinging of the front end of the clevis.

Pivotally mounted, as at 18', to the frame in rear of the cut out 4 is a shifting member comprising the main arm 19 and the laterally extending arms 20 disposed angularly thereto, one at each side thereof and with their outer ends raised above the upper surface of the main arm 19. The main arm is formed at its outer end with an elongated slot 20' in which is received the end of a stud $20^2$ projecting upwardly from the center of the upper clevis member 10.

A foot operated controlling bar 21 centrally pivoted as at 22, and having foot receiving seats or recesses 22' at its opposite ends, is positioned in front of the operator's seat 23, and the same connects at each end through a link 24 with one of the arms 20, the pivotal connecting points of which links 24 and bar 21 are slightly in advance of the point 22 on which the bar pivots.

My improved construction permits of the ready shifting of the clevis on the draft rod by pressure exerted on the foot operated lever. Unlike most draft devices of this type the foot operated lever is never in locked position, but is always held under tension by the operator, permitting the clevis to be quickly shifted on the draft bar to vary the direction of travel of the implement to maintain the same in the desired position relative to the material on which it is operating. By positioning the upwardly projecting stud centrally of the top member 10 and directly over the draft rod 6 all binding of the wheels 16 and 17 on the rod is eliminated as the thrust is at a point intermediate the wheels.

Having thus described my invention, what I claim as new and desire to protect by Letters Patent is:—

1. In combination with a vehicle frame having rear supporting wheels and one or more freely movable front caster wheels each pivoted on a vertical axis said frame recessed at its front end, a draft attachment therefor comprising a draft bar disposed transversely of said recess and connected at its ends to the implement frame, a clevis slidably mounted on said draft bar and freely movable longitudinally thereof and transversely of the longitudinal center of the implement frame, a grooved wheel carried by said clevis in rear of said draft rod and for resting thereon, a shifting member pivotally mounted on said frame, said member provided with a plurality of arms one of which overhangs said recess and coöperates with the clevis to shift the same on the draft bar, a pair of arms extended laterally from said shifting member and positioned one at each side of said first mentioned arm, a foot operated lever pivoted at its center to the frame and freely movable at all times, and a pair of rods pivotally connecting said arms with the corresponding ends of said lever, and the pivotal connecting points of said rods and lever being in advance of the pivotal point of the lever.

2. A draft attachment for vehicles comprising in combination with the vehicle frame, a draft bar extending transversely of the vehicle frame, a clevis for positioning over said draft bar, a wheel rotatably carried between the members of said clevis in rear of said draft rod and for resting thereon, a pair of spaced rotatably mounted idlers carried between the members of said clevis in advance of said bar, said roller and idlers preventing a lateral swinging of the clevis on the bar, a portion of the rear of said clevis projecting under the vehicle frame, a shifting member pivotally mounted on said frame, said member provided with a plurality of arms, one of said arms formed with a slot which coöperates with said clevis to shift the same on said draft bar, and a pair of arms extended laterally from said shifting member and positioned one at each side of said first mentioned arm, a foot operated controlling lever centrally pivoted to said frame and freely movable at all times, and a connection between the ends of said lever and said shifting member.

In testimony whereof I have signed my name to this specification in the presence of two subscribing witnesses.

GARDNER A. TAYLOR.

Witnesses:
 HARRY A. TOTTEN,
 ELINOR D. PRATT.